United States Patent
Suthmann (12)

(10) Patent No.: US 6,235,989 B1
(45) Date of Patent: May 22, 2001

(54) PROTECTIVE DEVICE FOR THE POWER CABLE OF A SUBMERGED PUMP

(75) Inventor: Michael Suthmann, Allershausen (DE)

(73) Assignee: EMU Unterwasserpumpen GmbH, Hof (DE)

(*) Notice: Subject to any disclaimer, the term of this patent is extended or adjusted under 35 U.S.C. 154(b) by 0 days.

(21) Appl. No.: 09/331,130

(22) PCT Filed: Nov. 7, 1997

(86) PCT No.: PCT/DE97/02637

§ 371 Date: Jun. 15, 1999

§ 102(e) Date: Jun. 15, 1999

(87) PCT Pub. No.: WO98/28544

PCT Pub. Date: Jul. 2, 1998

(30) Foreign Application Priority Data

Dec. 21, 1996 (DE) .......................................... 296 22 261 U

(51) Int. Cl.$^7$ ...................................................... H02G 3/04
(52) U.S. Cl. ........................ 174/48; 174/46; 174/50.55; 174/135
(58) Field of Search .................................. 174/46, 48, 50.54, 174/50.55, 50.57, 52.1, 37, 135; 138/110

(56) References Cited

U.S. PATENT DOCUMENTS

| | | | |
|---|---|---|---|
| 2,627,816 | * 2/1953 | Kaatz | 417/422 |
| 2,969,740 | * 1/1961 | Kaatz | 417/418 |
| 4,328,619 | * 5/1982 | Lefevre et al. | 33/161 |
| 5,435,507 | * 7/1995 | Murphy | 248/74.4 |
| 5,443,232 | * 8/1995 | Kesinger et al. | 248/62 |
| 5,580,239 | * 12/1996 | Jang | 431/253 |
| 5,587,555 | * 12/1996 | Rinderer | 174/48 |
| 5,700,977 | * 12/1997 | Ford et al. | 174/64 |
| 5,769,603 | * 6/1998 | Fujiwara et al. | 415/169.1 |
| 5,817,980 | * 10/1998 | Kirma | 174/86 |
| 6,003,559 | * 12/1999 | Baker | 138/108 |

* cited by examiner

Primary Examiner—Anthony Dinkins
Assistant Examiner—Angel R. Estrada
(74) Attorney, Agent, or Firm—Schweitzer Cornman Gross & Bondell LLP

(57) ABSTRACT

In general submerged pumps are lowered into a trench by means of the power cable (12) which passes into the pump head (10). In order to avoid an unnecessary loading on the power cable (12) the invention proposes providing a protective hose which surrounds the power cable (12) and which is secured to the pump head (10) and by means of which the submerged pump can be lowered without in that case loading the power cable.

9 Claims, 4 Drawing Sheets

PROTECTIVE DEVICE FOR THE POWER CABLE OF A SUBMERGED PUMP

BACKGROUND OF THE INVENTION

The invention concerns a protective device for the power cable of a submerged pump in which the power cable passes into the pump head, wherein there is provided a protective hose which surrounds the power cable and which is secured to the pump head.

A protective device of that kind is known from U.S. Pat. No. 2,627,816 and U.S. Pat. No. 2,969,740. The protective hose of those known protective devices however only serves to form a fluid-tight closure to the pump head in order to prevent fluid from penetrating into the motor compartment of the submerged pump.

In general submerged pumps are lowered into the trenches on the power cable. As that cable is neither designed for nor is suitable for a loading of that kind, fault situations frequently occur.

In addition, upon being lowered into the trench, the cable can become hooked up or jammed or otherwise damaged.

Therefore the object of the invention is to propose a structure which permits the submerged pump to be safely and reliably lowered and which affords the power cable protection.

BRIEF DESCRIPTION OF THE INVENTION

In accordance with the invention, in a protective device of the kind set forth in the opening part of this specification, that object is attained in that the protective hose is secured as a lowering aid to the pump head for avoiding loadings on the power cable when lowering the submerged pump.

In accordance with the invention the submerged pump is no longer lowered into the trench by way of the power cable but by way of the protective hose so that the power cable is free from any loading of that kind.

The gripping device can be a conventional gripping ring.

In another embodiment, a first clamping portion is rigidly connected to the pump head, and a second clamping portion can be fixed, with the inclusion of the protective hose, to the first clamping portion in the region of the clamping sleeve.

Both in the first embodiment and also in the second embodiment a secure connection is produced between the protective hose and the submerged pump without the power cable being loaded. On the contrary it passes into the pump head in loose relationship therewith.

A further clamping sleeve can be provided at the end of the protective hose remote from the pump head, within the protective hose, through which further clamping sleeve the power cable is movably guided, and there can be provided a gripping device which engages the protective hose from the exterior for clamping the protective hose fast to the clamping sleeve, in which case the gripping device can be securable to a pull or tension cable.

Preferably the gripping device has a loop for securing a pull cable.

The pull cable serves if required for increasing the length of the protective hose if the length thereof when lowering the submerged pump into the trench should not be sufficient.

Advantageously the protective hose is provided thereon with length markings, by reference to which it is possible to read off how deep the submerged pump is in the water.

The protective hose can be an inexpensive mass-produced item so that the structure according to the invention is correspondingly inexpensive. It protects the power cable from bending, knocks and jamming, as can occur in trenches. The arrangement affords a particularly good grip by virtue of the thickness of the protective hose.

BRIEF DESCRIPTION OF THE DRAWINGS

The invention will now be described in greater detail by means of two embodiments and with reference to the accompanying drawings in which.

DETAILED DESCRIPTION OF THE INVENTION

Figure 1:
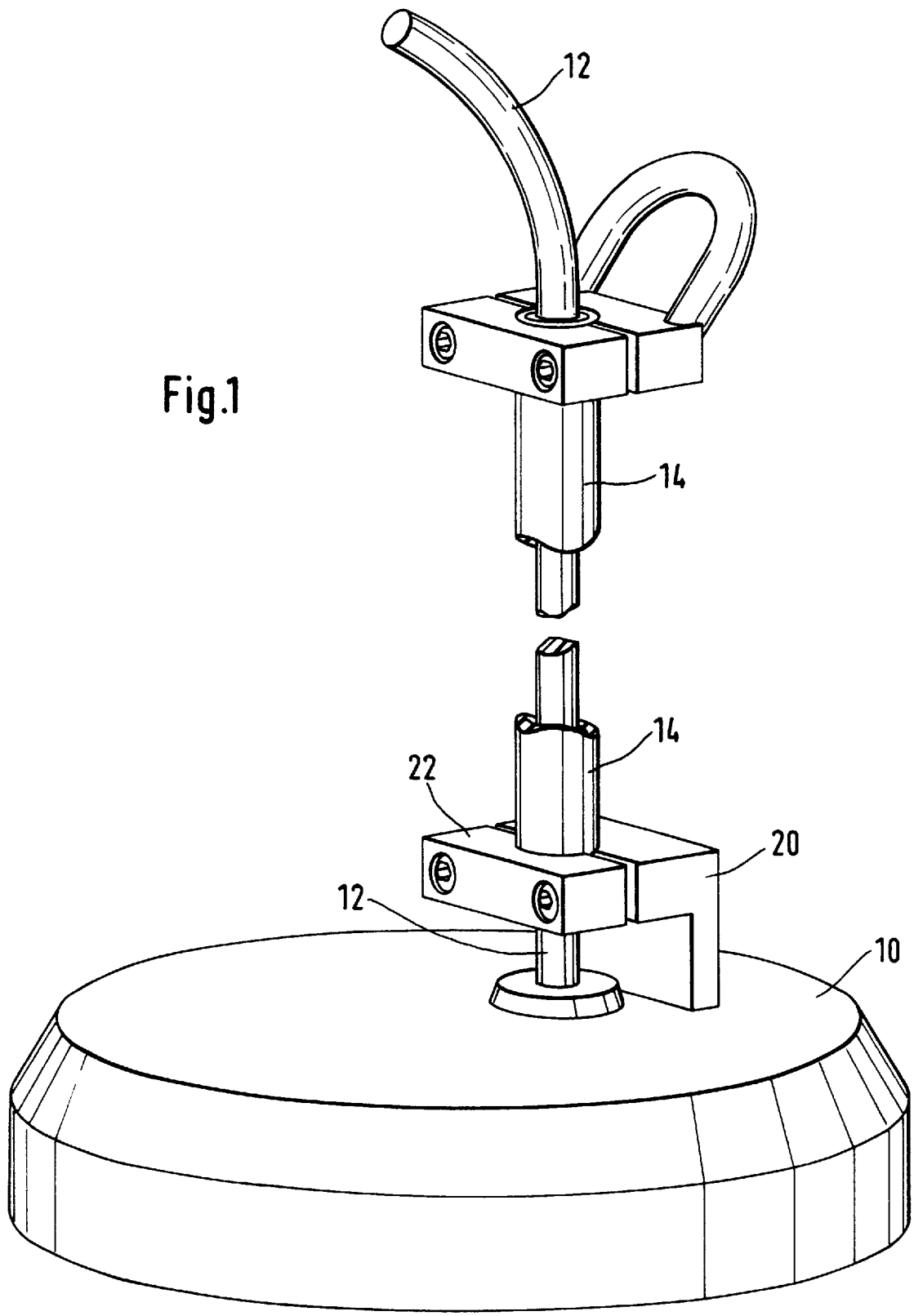
FIG. 1 is a perspective view of the protective device according to the invention for the power cable of a submerged pump.

Referring to the Figures, shown therein is a power cable 12 which passes into the pump head 10 of a submerged pump (not shown entirely) and which, as illustrated, is enclosed by a protective hose 14. In the embodiment shown in FIG. 2, fitted in the protective hose 14 at the lower end thereof is a clamping sleeve 16, the inside diameter of which is larger than the outside diameter of the power cable 12 so that the power cable 12 is passed loosely through the clamping sleeve 16. Disposed at the end of the protective hose 14, that is remote from the pump head 10, is a clamping sleeve 18 which is also fitted into the end of the hose and the inside diameter of which is larger than the outside diameter of the power cable 12 so that in this case also the power cable 12 is guided loosely in the clamping sleeve 18.

Figure 2:
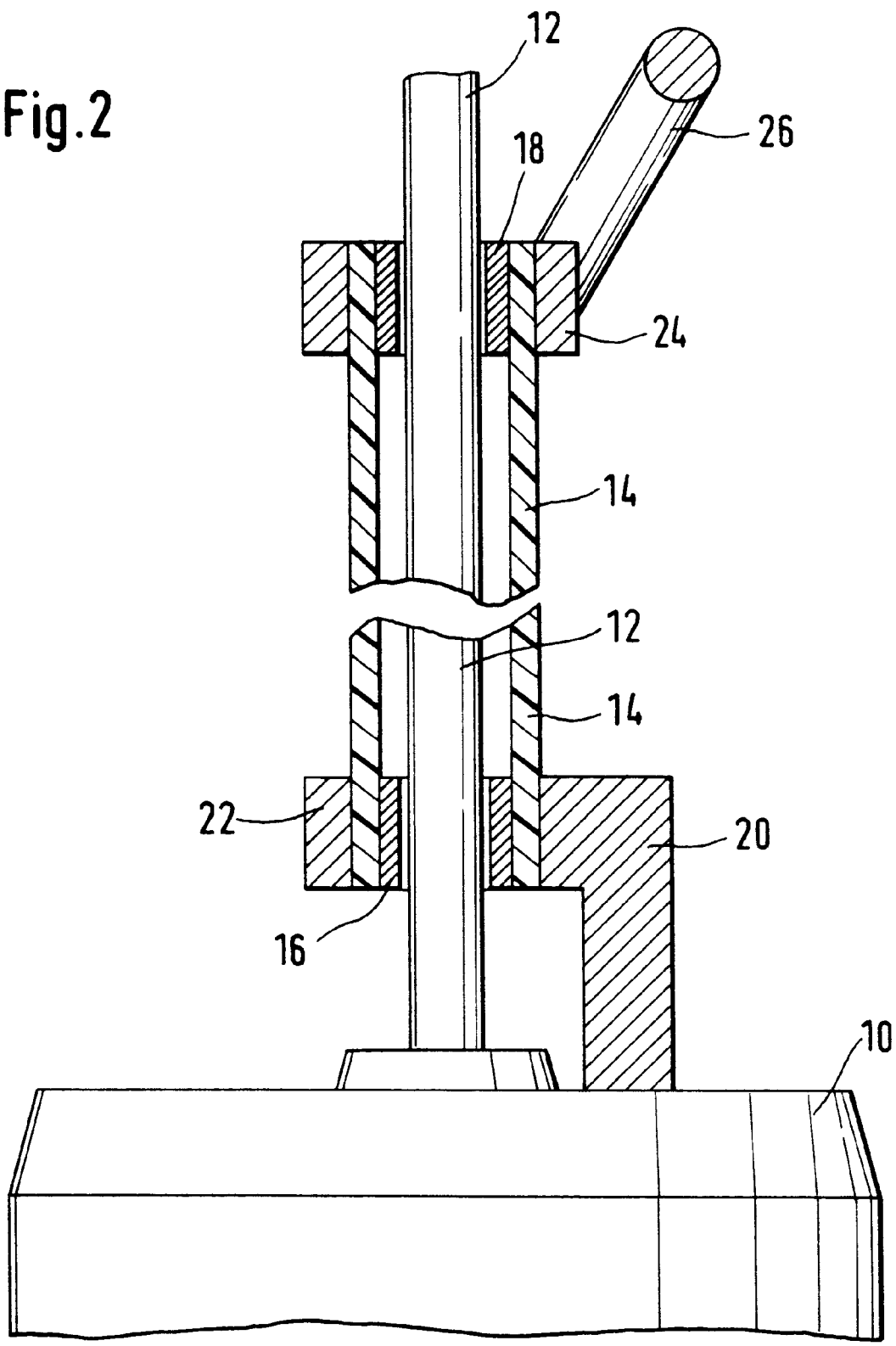
FIG. 2 is a partly sectional view of the first embodiment illustrated in FIG. 1 of the protective device according to the invention.

As can be seen from FIGS. 1 and 2 a first clamping portion 20 is rigidly mounted to the pump head 10 of the submerged pump and co-operates with a second clamping portion 22 in such a way that the protective hose 14 is clamped fast between the outer periphery of the clamping sleeve 16 and the clamping portions 20 and 22 which act as clamping jaws, so that, with the power cable being held loosely, the submerged pump can be let down into a trench by way of the protective hose 14. FIG. 1 shows that the second clamping portion 22 can be clamped fast to the first clamping portion 20 in the usual way by means of screws, with the protective hose 14 included therebetween.

Also disposed at the end of the protective hose 14, that is remote from the pump head 10, is a gripping device 24 whose mode of operation is similar to that of the clamping portions 20 and 21. Provided on the gripping device 24 is a loop 26 to which a pulling or extension cable can be secured, which is used when the length of the protective hose 14 is not sufficient.

Figure 3:
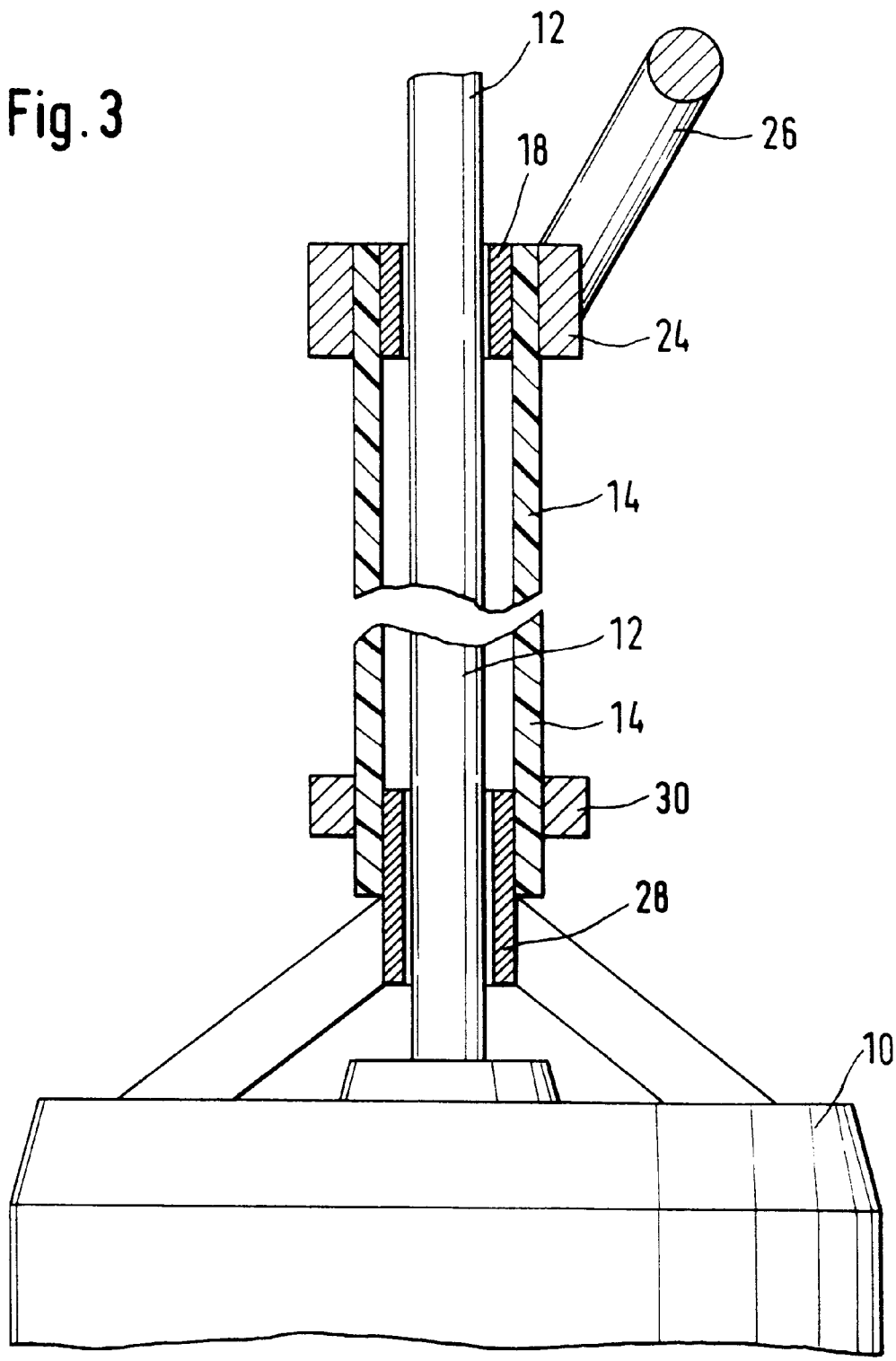
FIG. 3 is a partly sectional view of an embodiment which is modified in comparison with FIG. 2.
Figure 4:
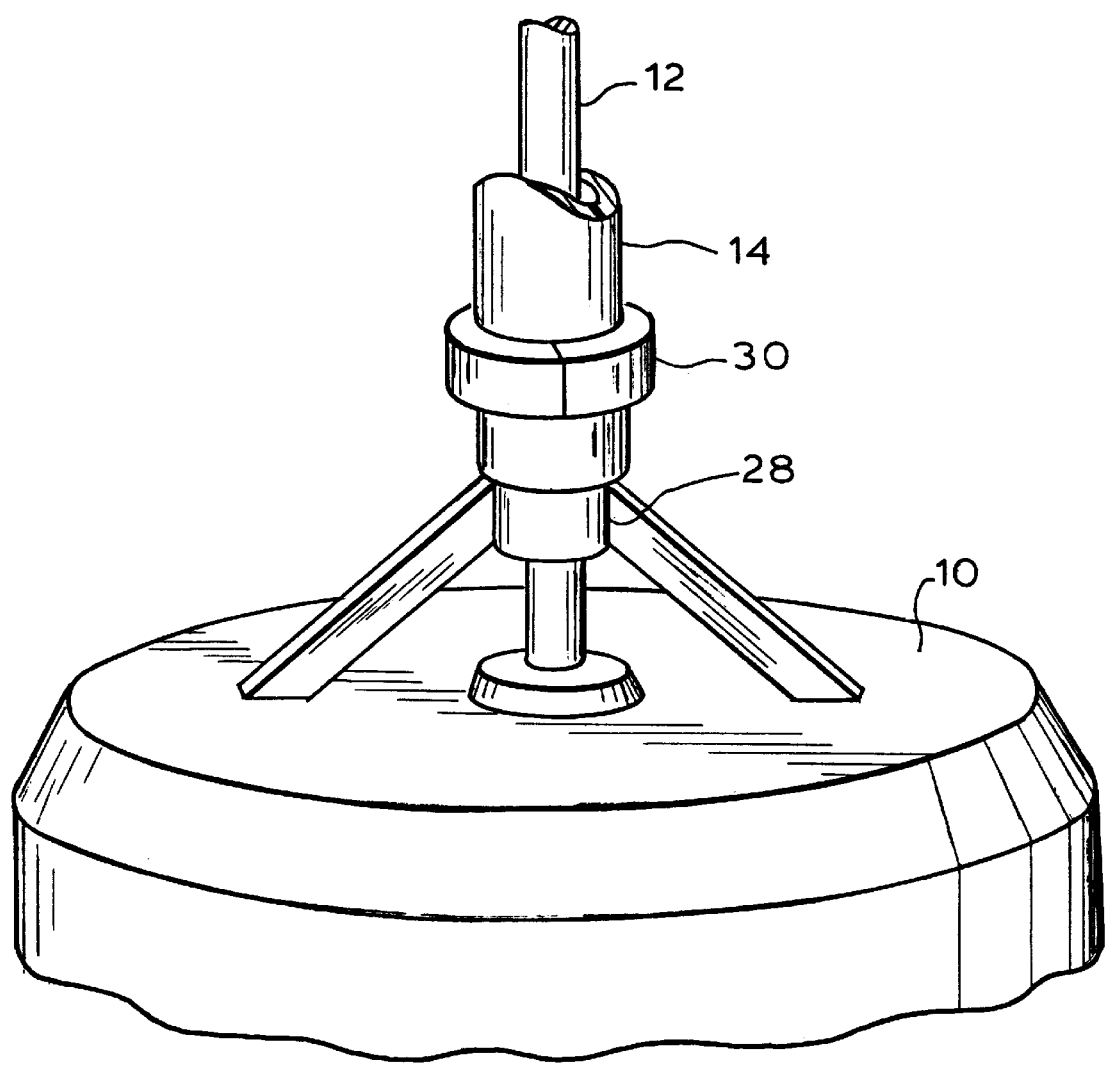
FIG. 4 is a perspective view of the lower portion of the embodiment of FIG. 3.

The embodiment of FIG. 3 and FIG. 4 differs from the preceding embodiment in that, in place of the short clamping sleeve 16, it uses a longer clamping sleeve 28 at the end of the protective hose 14, that is adjacent in the pump head. That clamping sleeve 28 projects out of the end of the protective hose 14, that is adjacent to the pump head 10, and is fixedly mounted on the pump head 10, as diagrammatically illustrated. A gripping device in the form of a gripping ring 30 fixedly clamps the protective hose 14 to the clamping sleeve 28, similarly to the situation with the preceding embodiment.

The construction according to the invention, described hereinbefore by means of the two embodiments, ensures that the power cable is mounted floatingly or movably in protected fashion in the protective hose which serves as a aid in lowering the pump.

What is claimed is:

1. A protective device for a power cable of a submerged pump in which the power cable passes into a pump head, the power cable being surrounded by a protective hose which is secured to the pump head, comprising a first clamping sleeve fitted at least into an end of the protective hose adjacent to the pump head, the power cable being guided movably through the first clamping sleeve, the first clamping sleeve projecting out of the protective hose and being fixedly connected by an outwardly-projecting end to the pump head; and a first gripping device engaging the protective hose from an exterior thereof for clamping the protective hose fast to the first clamping sleeve.

2. A protective device as set forth in claim 1 characterised in that the power cable (12) is longitudinally movably mounted in the protective hose (14).

3. A protective device as set forth in claim 1 or claim 2 characterized in that the protective hose (14) is flexible whereby the power cable can be rolled up.

4. A protective device as set forth in claim 1 characterised in that the gripping device is a gripping ring.

5. A protective device as set forth in claim 1 characterised in that a first clamping portion (20) is rigidly connected to the pump head (10) and a second clamping portion (22) is fixed to the first clamping portion in a region of the clamping sleeve (16), to embrace the protective hose (14).

6. A protective device as set forth in one of claims 1 or 2 characterized in that provided at an end of the protective hose (14) remote from the pump head (10) within the protective hose (14) is a second clamping sleeve (18) through which the power cable (12) is movably guided, and that there is provided a second gripping device (24) which engages the protective hose (14) from an exterior thereof, for clamping the protective hose fast to the second clamping sleeve (18), wherein a pull cable can be secured to the second gripping device (24).

7. A protective device as set forth in claim 6 characterised in that the second gripping device (24) has a loop (26) for securing the pull cable.

8. A protective device as set forth in one of claims 1 or 2 characterised in that length markings are provided on the protective hose (14).

9. A protective device for a power cable of a submerged pump in which the power cable passes into a pump head and the power cable being surrounded by a protective hose which is secured to the pump head, characterized in that the protective hose is so secured as a lowering aid to the pump head to avoid loadings on the power cable when lowering the submerged pump; a first clamping sleeve is fitted into an end of the protective hose adjacent to the pump head and the power cable is guided movably through the first clamping sleeve and a second clamping sleeve through which the power cable is movably guided is provided at an end of the protective hose remote from the pump head, there being further provided a gripping device which engages the protective hose from an exterior thereof for clamping the protective hose fast to the second clamping sleeve, wherein a pull cable can be secured to the gripping device.

* * * * *